(12) United States Patent
Do et al.

(10) Patent No.: US 10,644,306 B2
(45) Date of Patent: May 5, 2020

(54) LITHIUM SECONDARY BATTERY

(71) Applicant: SK INNOVATION CO., LTD., Seoul (KR)

(72) Inventors: Young Hoon Do, Daejeon (KR); Yong Hyun Cho, Daejeon (KR); Min Gu Kang, Daejeon (KR); Soo Ho Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 16/251,446

(22) Filed: Jan. 18, 2019

(65) Prior Publication Data
US 2019/0221830 A1     Jul. 18, 2019

(30) Foreign Application Priority Data

Jan. 18, 2018   (KR) .................. 10-2018-0006460

(51) Int. Cl.
| | | |
|---|---|---|
| *H01M 4/131* | (2010.01) | |
| *H01M 4/525* | (2010.01) | |
| *H01M 4/505* | (2010.01) | |
| *H01M 4/485* | (2010.01) | |
| *H01M 10/0525* | (2010.01) | |
| *H01M 4/02* | (2006.01) | |

(52) U.S. Cl.
CPC ............ *H01M 4/131* (2013.01); *H01M 4/02* (2013.01); *H01M 4/485* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ........ H01M 4/02; H01M 4/131; H01M 4/485; H01M 4/505; H01M 4/525; H01M 10/0525; H01M 2004/021; H01M 2004/028
USPC ......................................................... 429/209
See application file for complete search history.

(56) References Cited

U.S. PATENT DOCUMENTS 8,865,348 B2 † 10/2014 Sun

FOREIGN PATENT DOCUMENTS

| EP | 2662915 A2 † | 11/2013 |
|---|---|---|
| EP | 2940761 A1 † | 4/2015 |
| KR | 101407606 B1 † | 6/2014 |
| KR | 1020170093085 | 8/2017 |
| KR | 20170102293 A1 † | 9/2017 |

OTHER PUBLICATIONS

Machine Translation of KR 101407606 by Cho et al. "Method for Preparing Positive Active Material for Rechargeable Lithium Battery, Positive Active Material Prepared using Same, and Rechargeable Lithium Battery including Same" (Year: 2011).*

* cited by examiner
† cited by third party

*Primary Examiner* — Robert S Jones
*Assistant Examiner* — Abibatu O Ojo-Amoo
(74) *Attorney, Agent, or Firm* — IP & T Group LLP (57) ABSTRACT

A lithium secondary battery comprises a cathode active material including a first cathode active material particle having a concentration gradient region and a second cathode active material particle having a single particle structure, to obtain improved electrical performance and mechanical stability.

11 Claims, 4 Drawing Sheets

LITHIUM SECONDARY BATTERY

CROSS-REFERENCE TO RELATED APPLICATION AND CLAIM OF PRIORITY

This application claims priority to Korean Patent Applications No. 10-2018-0006460 filed on Jan. 18, 2018 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including a lithium metal oxide.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. Further, a stability of the lithium secondary battery or the cathode active material under a harsh condition at a high temperature or a low temperature is also required as an industrial application of the lithium secondary battery is expanded. Additionally, when the lithium secondary battery or the cathode active material is penetrated by an external object, a resistance with respect to failures such as a short-circuit, an ignition or an explosion may be also needed.

However, the cathode active material having all of the above-mentioned properties may not be easily achieved. For example, Korean Publication of Patent Application No. 10-2017-0093085 discloses a cathode active material including a transition metal compound and an ion adsorbing binder which may not have sufficient life-span and stability.

SUMMARY

According to an aspect of the present invention, there is provided a lithium secondary battery having improved electrical and mechanical reliability, long life-span and stability.

According to exemplary embodiments, a lithium secondary battery comprises a cathode formed from a cathode active material including a first cathode active material particle and a second cathode active material particle, an anode and a separator interposed between the cathode and the anode. The first cathode active material particle includes a lithium metal oxide including a concentration gradient region between a central portion and a surface. The second cathode active material particle includes a lithium metal oxide having a single particle structure, and is represented by Chemical Formula 1.

$$Li_xM1'_aM2'_bM3'_cO_y$$ [Chemical Formula 1]

In Chemical Formula 1, M1', M2' and M3' are selected from Ni, Co, Mn, Na, Mg, Ca, Ti, V, Cr, Cu, Zn, Ge, Sr. Ag. Ba, Zr, Nb, Mo, Al, Ga. W or B, and $0<x\le1.1$, $2\le y\le2.02$, $0.7\le a\le0.9$, $0.1\le b+c\le0.3$ and $a+b+c=1$.

In some embodiments, the single particle structure may include a single crystalline structure.

In some embodiments, the first cathode active material particle may include a first metal having a concentration decreasing region between the central portion and the surface, and a second metal having a concentration increasing region between the central portion and the surface.

In some embodiments, the first cathode active material particle may further include a third metal having a constant concentration from the central portion to the surface.

In some embodiments, the first cathode active material particle may be represented by Chemical Formula 2.

$$Li_xM1_aM2_bM3_cO_y$$ [Chemical Formula 2]

In Chemical Formula 2, M1, M2 and M3 may each represent the first metal, the second metal and the third metal, and are selected from Ni, Co, Mn, Na, Mg, Ca, Ti, V, Cr, Cu, Zn, Ge, Sr, Ag, Ba, Zr, Nb, Mo, Al, Ga or B, and $0\le x\le1.1$, $2\le y\le2.02$, $0<a<1$, $0<b<1$, $0<c<1$, and $0<a+b+c\le1$.

In some embodiments, $0.6\le a\le0.95$ and $0.05\le b+c\le0.4$ in Chemical Formula 2.

In some embodiments, $0.7\le a\le0.9$ and $0.1\le b+c\le0.3$ in Chemical Formula 2.

In some embodiments, the first metal may be nickel (Ni), the second metal may be manganese (Mn) and the third metal may be cobalt (Co).

In some embodiments, M1', M2' and M3' of the Chemical Formula 2 may be Ni, Mn and Co, respectively.

In some embodiments, a blending weight ratio of the first cathode active material particle and the second cathode active material particle may be in a range from 8:2 to 1:9.

In some embodiments, a blending weight ratio of the first cathode active material particle and the second cathode active material particle may be in a range from 8:2 to 6:4.

In some embodiments, an average diameter ($D_{50}$) of the first cathode active material particle may be in a range from about 6 μm to about 20 μm.

In some embodiments, an average diameter ($D_{50}$) of the second cathode active material particle may be in a range from about 2 μm to about 6 μm.

According to exemplary embodiments as described above, a cathode active material of a lithium secondary battery may include a first cathode active material particle having a concentration gradient region, and a second cathode active material particle having a single particle structure. High capacity and power of the lithium secondary battery may be realized by the first cathode active material particle, and penetration stability, thermal stability and long life-span of the lithium secondary battery may be obtained by the second cathode active material particle.

Therefore, both electrical performance and mechanical stability of the lithium secondary battery may be improved.

In exemplary embodiments, a size of the second cathode active material particle may be controlled or a coating layer may be formed on the first cathode active material particle to further improve cell stability and penetration stability.

DETAILED DESCRIPTION OF THE EMBODIMENTS

Embodiments of the present invention provide a lithium secondary battery comprises a cathode active material including a first cathode active material particle having a concentration gradient region and a second cathode active material particle having a single particle structure, to obtain improved electrical performance and mechanical stability.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "a first" and "a second" used herein are not intended to specify the number or the order of objects, and only used to identify different elements or objects.

Figure 1:
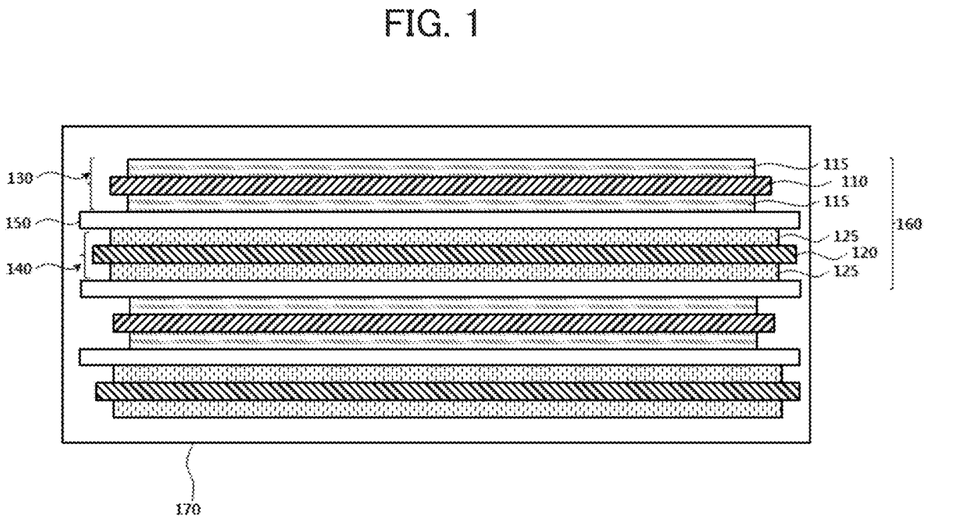
FIG. 1 is a schematic cross-sectional view illustrating a lithium secondary battery in accordance with exemplary embodiments.

FIG. 1 is a schematic cross-sectional view illustrating a lithium secondary battery in accordance with exemplary embodiments.

Referring to FIG. 1, a lithium secondary battery may include a cathode 130, and anode 140 and a separation layer 150 interposed between the cathode 130 and the anode 140.

The cathode may include a cathode current collector 110 and a cathode active material layer 115 formed by coating a cathode active material on the cathode current collector 110. In exemplary embodiments, the cathode active material may include a first cathode active material particle and a second cathode active material particle.

The second cathode active material particle may include a lithium metal oxide having a single particle structure.

For example, the single particle structure may include a single crystalline structure or a structure in which a plurality of crystals are fused together as one particle. Preferably, the single crystal structure may have improved life-span and penetration stability.

Figure 2A:
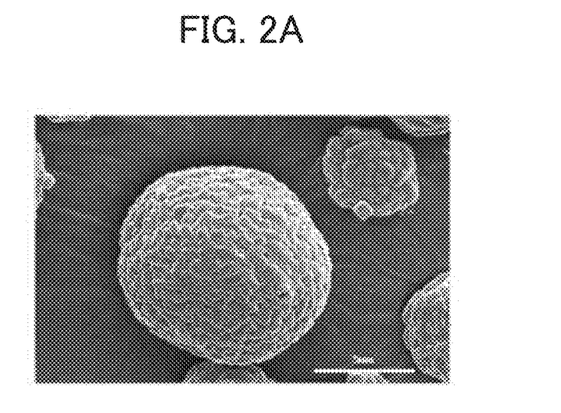
FIGS. 2A and 2B are scanning electron microscopy (SEM) images of a lithium metal oxide having a secondary particle structure formed from a plurality of primary particles.
Figure 2B:
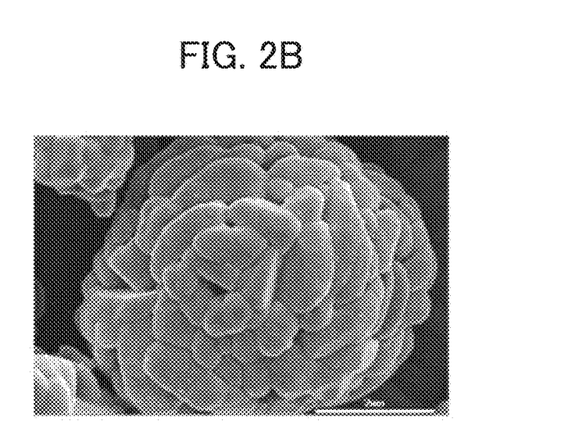

FIGS. 2A and 2B are scanning electron microscopy (SEM) images of a lithium metal oxide having a secondary particle structure formed from a plurality of primary particles.

Figure 3A:
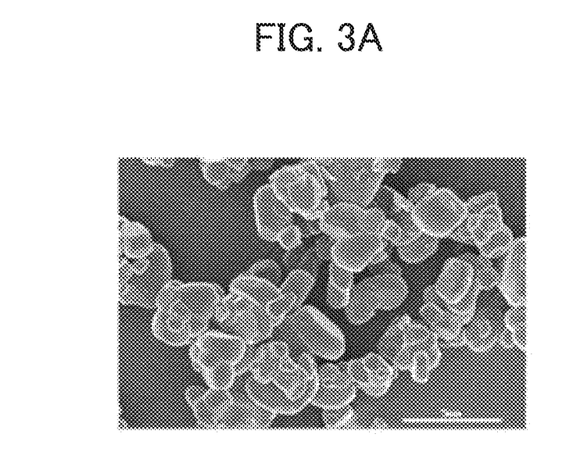
FIGS. 3A and 3B are SEM images illustrating a second cathode active material particle having a single particle structure in accordance with exemplary embodiments.
Figure 3B:
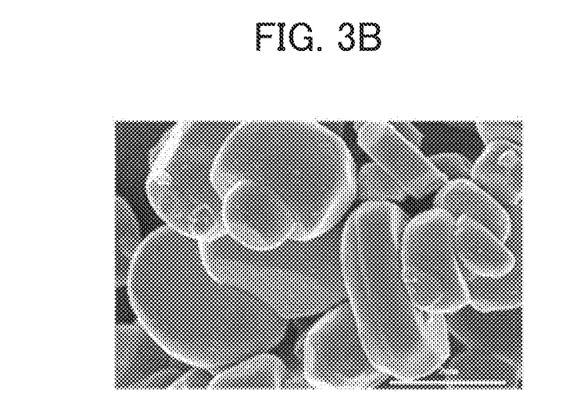

FIGS. 3A and 3B are SEM images illustrating a second cathode active material particle having a single particle structure (e.g., a single crystalline structure) in accordance with exemplary embodiments.

In the present invention, the single particle structure of a cathode active material may indicate a structure in which one lithium metal oxide grain function as a cathode active material. FIG. 2 shows an image of a general structure of a cathode active material, and FIG. 3 shows an image of a structure of a cathode active material having a single particle structure.

In the cathode active material of FIG. 2, primary particles are aggregated to form a secondary particle, and the secondary particle may function as a cathode active material particle. However, in the cathode active material of FIG. 3, a primary particle may function as a cathode active material particle.

According to an embodiment of the present invention, the second cathode active material having a single particle structure may be superior in heat resistance to a cathode active material of a secondary particle type, to improve stability of a battery. For example, the cathode active material having the single particle structure may have an exothermic peak of 25 J/g or less at a temperature of 320° C. or more in DSC measurement.

Therefore, the cathode active material having the single particle structure according to the present invention may improve overcharge and penetration stability of a battery. For example, when a secondary battery using mixture of a conventional cathode active material (e.g., secondary particle type) and the first cathode active material is penetrated, overcurrent may be occurred. Therefore, a large amount of heat energy is generated in a short time due, so that the secondary battery may be ignited or exploded. However, when the second cathode active material and the first cathode active material are blended, the amount of heat energy is remarkably reduced even if the secondary battery is penetrated and overcurrent flows. Therefore, it is possible to prevent the battery from easily igniting.

In some embodiments, the second cathode active material particle may be represented by Chemical Formula 1.

$$Li_xM1'_aM2'_bM3'_cO_y \qquad \text{[Chemical Formula 1]}$$

In Chemical Formula 1, M1', M2' and M3' may be selected from Ni, Co, Mn, Na, Mg, Ca, Ti, V, Cr, Cu, Zn, Ge, Sr, Ag, Ba, Zr, Nb, Mo, Al, Ga, W or B, and $0<x\leq1.1$, $2\leq y\leq2.02$, $0.7\leq a\leq0.9$, $0.1\leq b+c\leq0.3$ and $a+b+c=1$.

In some embodiments, M1', M2' and M3' of the Chemical Formula 2 may be Ni, Mn and Co, respectively.

Since the second cathode active material particle may have a single particle structure, stability of a particle structure can further improve cell stability. Accordingly, the first cathode active material particle and the second cathode active material particle can be blended to improve a high capacity and a high output while ensuring cell stability.

In some embodiments, an average diameter ($D_{50}$) of the second cathode active material particle may be in a range from about 1 μm to about 8 μm.

In some embodiments, the second cathode active material particle may further include a coating layer on the surface thereof. For example, the coating layer may include Al, Ti, Ba, Zr, Si, B, Mg, P, an alloy thereof or an oxide thereof.

The first cathode active material particle may include a lithium metal oxide having a concentration gradient region from a central portion of the particle to a surface of the particle. In some embodiments, the first cathode active material may include a first lithium metal oxide in which at least one metal included therein may have a concentration gradient region between a central portion and a surface portion, so that the life-span of the lithium secondary battery may be greater than that of the lithium secondary battery including a cathode active material with a fixed concentration.

For example, which the lithium metal oxide included in the first cathode active material has the concentration gradient region may indicate a concentration of a metal except for lithium having concentration distribution region changing with a uniform trend or tendency between the central portion and the surface portion of the lithium metal oxide particle. The uniform trend or tendency may indicate that a overall trend of concentration change decrease or increase, and it does not exclude that it has a value opposite to the trend at some point within the scope of the present invention.

In some embodiments, each concentration of lithium and oxygen may be substantially fixed throughout an entire region of the particle, and at least one element except for lithium and oxygen may have the concentration gradient region.

The term "central portion" used herein may include a central point of the active material particle and may also include a region within a predetermined radius from the central point. For example, "central portion" may encompass a region within a radius of about 0.1 μm from the central point of the active material particle.

The term "surface portion" used herein may include an outermost surface of the active material particle, and may also include a predetermined thickness from the outermost surface. For example, "surface portion" may include a region within a thickness of about 0.1 μm from the outermost surface of the active material particle.

In some embodiments, the concentration gradient region may include a linear concentration profile or a curved concentration profile. In the curved concentration profile, the concentration may change in a uniform trend without any inflection point.

In an embodiment, at least one metal except for lithium may have concentration decrease region between the central portion and the surface of the first cathode active material particle, and at least one metal may have concentration increase region between the central portion and the surface of the first cathode active material particle.

In an embodiment, at least one metal included in the first cathode active material particle except for lithium may have a substantially constant concentration from the central portion to the surface.

In an embodiment, metals included in the first cathode active material particle except for lithium may include a first metal M1 and a second metal M2. The first metal M1 may have a concentration-decreasing gradient region from the central portion to the surface of the cathode active material particle. The second metal M2 may have a concentration-increasing gradient region from the central portion to the surface of the cathode active material particle.

In an embodiment, the metals included in the first cathode active material particle except for lithium may further include a third metal M3. The third metal M3 may have a substantially constant concentration from the central portion to the surface.

The term "concentration" used herein may indicate, e.g., a molar ratio of the first to third metals.

For example, the first cathode active material particle may be represented by Chemical Formula 2.

[Chemical Formula 2]

In Chemical Formula 2, M1, M2 and M3 may be selected from Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0<a<1$, $0<b<1$, $0<c<1$, and $0<a+b+c\leq1$.

In some embodiments, M1, M2 and M3 of Chemical Formula 2 may be nickel (Ni), manganese (Mn) and cobalt (Co), respectively.

For example, nickel may serve as a metal related to a capacity of the lithium secondary battery. As an amount of nickel becomes higher, capacity and power of the lithium secondary battery may be improved. However, an excessive amount of nickel may degrade of a life-span property of the battery, and may be disadvantageous in an aspect of mechanical and electrical stability of the battery. For example, when the amount of nickel is excessively increased, defects such as ignition or short-circuit by a penetration of an external object may not be sufficiently suppressed.

However, according to exemplary embodiments, nickel may be included as the first metal M1. Thus, the amount of nickel at the central portion may be relatively high to improve the capacity and power of the lithium secondary battery, and a concentration of nickel may be decreased from the central portion to the surface to prevent the defects from the penetration and a life-span reduction.

For example, manganese (Mn) may serve as a metal related to the mechanical and electrical stability of the lithium secondary battery. In exemplary embodiments, an amount of Mn may be increased from the central portion to the surface so that the defects from the penetration such as ignition or short-circuit through the surface may be suppressed or reduced, and the life-span of the lithium secondary battery may be also enhanced.

For example, cobalt (Co) may serve as a metal related to a conductivity or a resistance of the lithium secondary battery. In exemplary embodiments, a concentration of cobalt may be fixed or uniformly maintained through an entire region of the first cathode active material particle. Thus, a current or a charge flow through the first cathode active material particle may be uniformly maintained while improving the conductivity of the battery and maintaining low resistance.

In some embodiments, in Chemical Formula 2, the first metal M1 may be nickel, and, e.g., $0.6\leq a\leq 0.95$ and $0.05\leq b+c\leq 0.4$. For example, a concentration (or a molar ratio) of nickel may be continuously decreased from about 0.95 to about 0.6.

If a lower limit of the nickel concentration (e.g., a surface concentration) is less than about 0.6, capacity and power at the surface of the first cathode active material particle may be excessively deteriorated. If an upper limit of the nickel concentration (e.g., a central concentration) exceeds about 0.95, life-span and mechanical stability at the central portion may be excessively degraded.

Preferably, in Chemical Formula 2, $0.7\leq a\leq 0.9$ and $0.1\leq b+c\leq 0.3$. In this case, both capacity and stability of the battery may be enhanced.

In some embodiments, the first cathode active material particle may further include a coating layer on the surface thereof. For example, the coating layer may include Al, Ti, Ba, Zr, Si, B. Mg, P, an alloy thereof or an oxide thereof. These may be used alone or in a mixture thereof. The first cathode active material particle may be passivated by the coating layer so that penetration stability and life-span of the battery may be further improved.

In an embodiment, the elements, the alloy or the oxide of the coating layer may be inserted in the first cathode active material particle as dopants.

In some embodiments, the first cathode active material particle may be formed from a primary particle having a rod-type shape. An average diameter ($D_{50}$) of the first cathode active material particle may be in a range from about 6 μm to about 20 μm. Preferably, the range may be from about 11 μm to about 16 μm.

Within the above range, life-span and stability of the lithium secondary battery or the cathode may be improved without interfering in an electrical activity of the first cathode active material particle by the second cathode active material particle. Preferably, the average diameter ($D_{50}$) of the second cathode active material particle may be in a range from about 2 μm to about 6 μm If the average diameter ($D_{50}$) of the second cathode active material particle is less than about 2 μm, a dimension of the particle may be excessively decreased, and desired composition, crystal structure, activity and stability may not be realized and controlled. If the average diameter ($D_{50}$) of the second cathode active material particle exceeds about 6 μm, an excessive amount of heat may be required for a particle formation to degrade process efficiency.

In exemplary embodiments, a mixing ratio of the first cathode active material particle and the second cathode active material particle may be, e.g., in a range from 8:2 to 1:9, preferably, from 8:2 to 6:4. Within the above range, a thermal stability improvement and a prevention of a penetration-induced ignition by the second cathode active material particle may be more effectively achieved.

The first and second cathode active material particles may be individually prepared, and then blended to obtain the cathode active material.

In a formation of the first cathode active material, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a lithium precursor (e.g., a lithium oxide), a nickel precursor, a manganese precursor and a cobalt precursor.

In exemplary embodiments, the first cathode active material particle and the second cathode active material particle may be blended to form the cathode active material. The cathode active material may be mixed and stirred together with a binder, a conductive additive and/or a dispersive additive in a solvent to form a slurry. The slurry may be coated on the cathode current collector 110, and pressed and dried to obtain the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the first and second cathode active material particles may be relatively increased. Thus, capacity and power of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), ETC. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

A separator 150 may be interposed between the cathode 130 and the anode 140. The separator 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separator 150 may be also formed from a non-woven fabric including a glass fiber with a high melting point, a polyethylene terephthalate fiber, or the like.

In some embodiments, an area and/or a volume of the anode 140 (e.g., a contact area with the separator 150) may be greater than that of the cathode 130. Thus, lithium ions generated from the cathode 130 may be easily transferred to the anode 140 without loss by, e.g., precipitation or sedimentation. Therefore, the enhancement of power and stability by the combination of the first and second cathode active material particles may be effectively implemented.

In exemplary embodiments, an electrode cell 160 may be defined by the cathode 130, the anode 140 and the separator 150, and a plurality of the electrode cells 160 may be stacked to form an electrode assembly having, e.g., a jelly roll shape. For example, the electrode assembly may be formed by winding, laminating or folding of the separator 150.

The electrode assembly may be accommodated in an external case 170 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by Li$^+$X$^-$, and an anion of the lithium salt X$^-$ may include, e.g., F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, (CF$_3$CF$_2$SO$_2$)$_2$N$^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the external case 170. The electrode tabs may be welded together with the one end of the external case 170 to form an electrode lead exposed at an outside of the external case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples 1-6: Fabrication of Lithium Secondary Battery (1) Cathode

Figure 4:
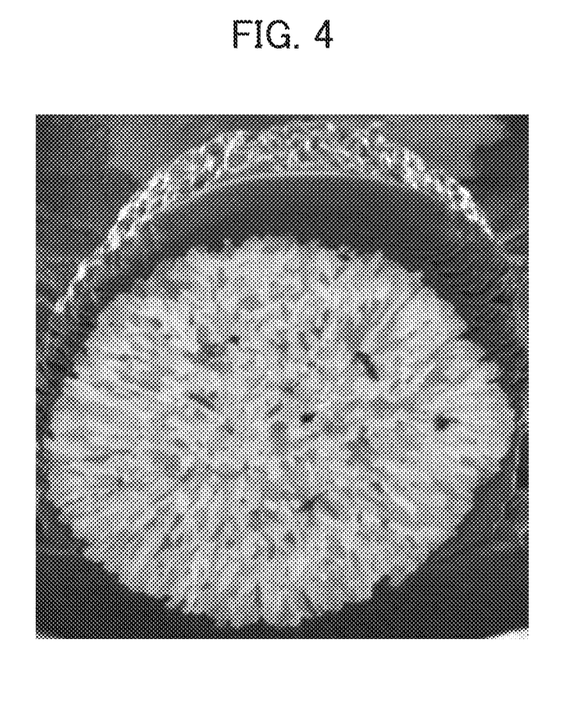
FIG. 4 is a cross-sectional image illustrating a first cathode active material particle prepared in accordance with exemplary embodiments.

The lithium metal oxide (first cathode active material particle) was precipitated by continuously changing the precursor mixing ratio. The total composition of the lithium metal oxide was LiNi$_{0.8}$Co$_{0.11}$Mn$_{0.09}$O$_2$, composition of the central portion was LiNi$_{0.802}$Co$_{0.11}$Mn$_{0.088}$O$_2$, composition of the surface was LiNi$_{0.77}$Co$_{0.11}$Mn$_{0.12}$O$_2$, and the concentration gradient region was formed from the central portion to the surface (FIG. 4).

Figure 5:
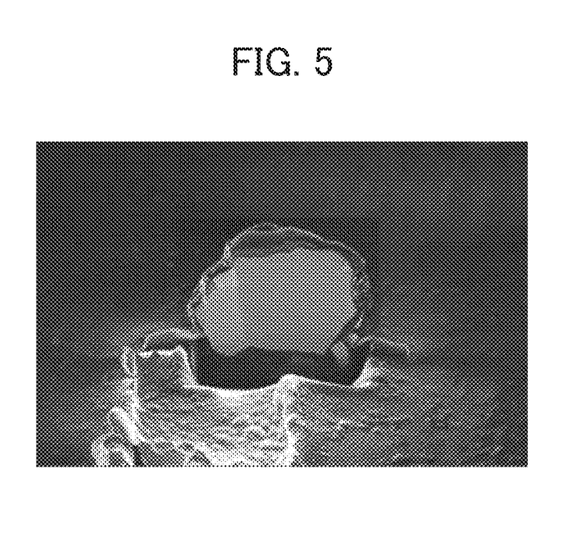
FIG. 5 is a cross-sectional image illustrating a second cathode active material particle having a single particle structure in accordance with exemplary embodiments.
Figure 6:
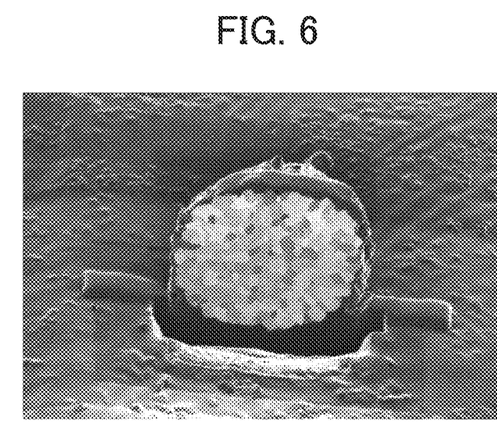
FIG. 6 is a cross-sectional image illustrating a second cathode active material particle having a secondary particle structure in accordance with Comparative Example.

LiNi$_{0.8}$Co$_{0.1}$Mn$_{0.1}$O$_2$ having a single crystalline structure (hereinafter, SC-NCM811) was used as the second cathode active material particle (FIG. 5).

The first cathode active material particles and the second cathode active material particles were mixed at the ratios shown in Table 1 below.

Denka Black was used as a conductive additive, and PVDF was used as a binder. The cathode active material, the conductive additive and the binder were mixed by a weight ratio of 92:5:3 to form a cathode electrode slurry. The cathode electrode slurry was coated, dried, and pressed on an aluminum substrate to form a cathode. A density of the cathode after the pressing was 3.3 g/cc.

(2) Anode

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

(3) Lithium Secondary Battery

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M LiPF$_6$ in a mixed solvent of EC/EMC/DEC (25/45/30, volume ratio), and then 1 wt % of vinylene carbonate, 0.5 wt % of 1,3-propensultone (PRS), and 0.5 wt % of lithium bis(oxalato)borate (LiBOB) were added.

The lithium secondary battery as fabricated above was pre-charged by applying a pre-charging current (2.5 A) corresponding to 0.25 C for 36 minutes. After 1 hour, the battery was degassed, aged for more than 24 hours, and then a formation charging-discharging (charging condition of CC-CV 0.2 C 4.2 V 0.05 C CUT-OFF, discharging condition CC 0.2 C 2.5 V CUT-OFF) was performed. Then, a standard charging-discharging (charging condition of CC-CV 0.5 C 4.2 V 0.05 C CUT-OFF, discharging condition CC 0.5 C 2.5 V CUT-OFF) was performed.

Comparative Examples 1-6

The second cathode active material particles were lithium metal oxides having LiNi$_{0.8}$Co$_{0.1}$Mn$_{0.1}$O$_2$ (hereinafter, NCM811) composition and a secondary particle structure formed by aggregating a plurality of primary particles.

The first cathode active material particle of the example above and the second cathode active material particle were mixed in the ratio shown in Table 1 below to prepare a lithium secondary battery.

Experimental Example 1

(1) Evaluation of Life-Span

The battery cells prepared as described in Table 2 below were repeatedly charged (CC-CV 1.0 C 4.2 V 0.05 C CUT-OFF) and discharged (CC 1.0 C 2.7 V CUT-OFF) 500 times, and then a discharging capacity at a 500th cycle was calculated as a percentage (%) with respect to a first cycle discharging capacity to measure the life-span property at a room temperature.

(2) Evaluation of Penetration Stability

The battery cells of Example and Comparative Examples were charged (1 C 4.2V 0.1 C CUT-OFF), and then the battery cells were penetrated by a nail having a diameter of 3 mm at a speed of 80 mm/sec to check whether ignition or explosion occurred (O: Ignition or explosion occurred, X: No ignition or explosion).

TABLE 1

| | First Lithium Metal Oxide | | Second Lithium Metal Oxide | | | Life-span Property (%) (500cycle) | Penetration Stability |
|---|---|---|---|---|---|---|---|
| | $D_{50}$ (μm) | Blending ratio (wt %) | $D_{50}$ (μm) | Species | Blending ratio (wt %) | | |
| Example 1 | 12 | 90 | 4 | SC-NCM811 | 10 | 90.1 | ○ |
| Example 2 | 12 | 80 | 4 | SC-NCM811 | 20 | 91.8 | X |
| Example 3 | 12 | 70 | 4 | SC-NCM811 | 30 | 93.2 | X |
| Example 4 | 12 | 60 | 4 | SC-NCM811 | 40 | 92.4 | X |
| Example 5 | 12 | 50 | 4 | SC-NCM811 | 50 | 89.1 | ○ |
| Example 6 | 12 | 70 | 1 | SC-NCM811 | 30 | 86.1 | ○ |
| Comparative Example 1 | 12 | 90 | 4 | NCM811 | 10 | 80.1 | ○ |
| Comparative Example 2 | 12 | 80 | 4 | NCM811 | 20 | 82.2 | ○ |
| Comparative Example 3 | 12 | 70 | 4 | NCM811 | 30 | 81.2 | ○ |
| Comparative Example 4 | 12 | 60 | 4 | NCM811 | 40 | 83.3 | ○ |
| Comparative Example 5 | 12 | 50 | 4 | NCM811 | 50 | 83.5 | ○ |
| Comparative Example 6 | 12 | 100 | — | — | — | — | ○ |

Examples 7-11

Secondary batteries were prepared by blending the first cathode active material particles and SC-NCM811 used in Example 1 at an 8:2 weight ratio.

Comparative Examples 7-11

Secondary batteries were prepared by blending the first cathode active material particles and SC-NCM811 used in Comparative Example 1 at an 8:2 weight ratio.

Experimental Example 2: Evaluation of Penetration Stability According to SoC (State of Charge)

The batteries of Examples 7 to 11 and Comparative Examples 7 to 11 were charged up to the SoC of the following Table 2 at a current of 1 C and the penetration evaluation was carried out.

TABLE 1

| | First Lithium Metal Oxide | Second Lithium Metal Oxide | | SoC (%) | Penetration Stability |
|---|---|---|---|---|---|
| | Blending ratio (wt %) | Species | Blending ratio (wt %) | | |
| Example 7 | 80 | SC-NCM811 | 20 | 100 | ○ |
| Example 8 | 80 | SC-NCM811 | 20 | 90 | ○ |
| Example 9 | 80 | SC-NCM811 | 20 | 80 | X |
| Example 10 | 80 | SC-NCM811 | 20 | 70 | X |
| Example 11 | 80 | SC-NCM811 | 20 | 60 | X |
| Comparative Example 7 | 80 | NCM811 | 20 | 100 | ○ |
| Comparative Example 8 | 80 | NCM811 | 20 | 90 | ○ |
| Comparative Example 9 | 80 | NCM811 | 20 | 80 | ○ |
| Comparative Example 10 | 80 | NCM811 | 20 | 70 | ○ |
| Comparative Example 11 | 80 | NCM811 | 20 | 60 | X |

Referring to Table 1, it can be seen that the life-span property of the secondary batteries of the Examples are superior to those of the Comparative Examples. In addition, Examples 2 to 4 using the second cathode active material having the single particle structure exhibited excellent penetration stability compared to Comparative Examples 2 to 4 using the secondary particle type cathode active material.

Referring to Table 2, in the penetration test, the battery of the Comparative Examples ignited when the SoC charging condition was 70% or more, but in the case of the Examples, the ignition occurred when the SoC charging condition was 90% or more. Thus, it was found that the penetration stability of the secondary battery of the example was improved.

What is claimed is:
1. A lithium secondary battery, comprising:
    a cathode formed from a cathode active material including a first cathode active material particle and a second cathode active material particle;
    an anode; and
    a separator interposed between the cathode and the anode, wherein the first cathode active material particle includes a lithium metal oxide including a concentration gradient region between a central portion and a surface, wherein the second cathode active material particle includes a lithium metal oxide having a single particle structure, and is represented by Chemical Formula 1, and a blending weight ratio of the first cathode active material particle and the second cathode active material particle is in a range from 8:2 to 1:9:

$$Li_xM1'_aM2'_bM3'_cO_y \qquad \text{[Chemical Formula 1]}$$

wherein, in Chemical Formula 1, M1', M2' and M3' are selected from Ni, Co, Mn, Na, Mg, Ca, Ti, V, Cr, Cu, Zn, Ge, Sr, Ag, Ba, Zr, Nb, Mo, Al, Ga, W or B, M1' includes Ni, M2' includes Co, M3' includes Mn, and $0<x\leq1.1$, $2\leq y\leq2.02$, $0.7\leq a\leq0.9$, $0.1\leq b+c\leq0.3$ and $a+b+c=1$.

2. The lithium secondary battery according to claim 1, wherein the single particle structure includes a single crystalline structure.

3. The lithium secondary battery according to claim 1, wherein the first cathode active material particle includes a first metal having a concentration decreasing region between the central portion and the surface, and a second metal having a concentration increasing region between the central portion and the surface.

4. The lithium secondary battery according to claim 3, wherein the first cathode active material particle further includes a third metal having a constant concentration from the central portion to the surface.

5. The lithium secondary battery according to claim 4, wherein the first cathode active material particle is represented by Chemical Formula 2:

$$Li_xM1_aM2_bM3_cO_y \qquad \text{[Chemical Formula 2]}$$

wherein, in Chemical Formula 2, M1, M2 and M3 each represents the first metal, the second metal and the third metal, and are selected from Ni, Co, Mn, Na, Mg, Ca, Ti, V, Cr, Cu, Zn, Ge, Sr, Ag, Ba, Zr, Nb, Mo, Al, Ga or B, and $0<x\leq1.1$, $2\leq y\leq2.02$, $0<a<1$, $0<b<1$, $0<c<1$, and $0<a+b+c\leq1$.

6. The lithium secondary battery according to claim 5, wherein $0.6\leq a\leq0.95$ and $0.05\leq b+c\leq0.4$ in Chemical Formula 2.

7. The lithium secondary battery according to claim 5, wherein $0.7\leq a\leq0.9$ and $0.1\leq b+c\leq0.3$ in Chemical Formula 2.

8. The lithium secondary battery according to claim 5, wherein the first metal is nickel (Ni), the second metal is manganese (Mn) and the third metal is cobalt (Co).

9. The lithium secondary battery according to claim 1, wherein a blending weight ratio of the first cathode active material particle and the second cathode active material particle is in a range from 8:2 to 6:4.

10. The lithium secondary battery according to claim 1, an average diameter ($D_{50}$) of the first cathode active material particle is in a range from 6 μm to 20 μm.

11. The lithium secondary battery according to claim 1, an average diameter ($D_{50}$) of the second cathode active material particle is in a range from 2 μm to 6 μm.

* * * * *